United States Patent [19]
Ellingsen et al.

[11] Patent Number: 6,086,655
[45] Date of Patent: Jul. 11, 2000

[54] PRODUCTION OF METAL SUCH AS ALUMINUM, MAGNESIUM, SILICON FROM METAL OXIDE COMPOUNDS

[75] Inventors: Olav Ellingsen; Liv Sørebø Ellingsen; Bjarte Sørebø Ellingsen, all of Florø, Norway

[73] Assignee: Industrikontakt, Ing. O Ellingsen & Co., Floro, Norway

[21] Appl. No.: 09/051,842

[22] PCT Filed: Oct. 23, 1996

[86] PCT No.: PCT/NO96/00250

§ 371 Date: Apr. 22, 1998

§ 102(e) Date: Apr. 22, 1998

[87] PCT Pub. No.: WO97/16576

PCT Pub. Date: May 9, 1997

[30] Foreign Application Priority Data

Nov. 2, 1995 [NO] Norway ..................................... 954392

[51] Int. Cl.[7] ...................................................... C22B 21/00
[52] U.S. Cl. ................................................. 75/673; 75/674
[58] Field of Search ....................................... 75/673, 674

[56] References Cited

U.S. PATENT DOCUMENTS 4,261,736  4/1981  Dewing et al. .

FOREIGN PATENT DOCUMENTS 2359903  2/1978  France .
2737515  7/1979  Germany .
WO 9115607  10/1991  WIPO .

OTHER PUBLICATIONS

Derwent's abstract, No. 79–17162B/09, week 7909, Abstract Of JP, 54010274 (Sato M), Jan. 25, 1979.

*Primary Examiner*—Ngoclan Mai
*Attorney, Agent, or Firm*—Merchant & Gould, PC

[57] ABSTRACT

A thermo-mechanical process for producing aluminum or other metals from aluminium or metal compounds, is described, whereby aluminum oxide or similar aluminium compounds or similar other metal compounds, are heated by friction generated by mechanical forces from a rotating and/or agitating means within a process chamber together with either free water or waterforming constituents in the aluminium-or-metal compounds and a hydrogen- and carbon delivering material such as oil or natural gas, such as methane, and carbon in such a manner that material in the reactor chamber behaves like a hot mechanical fluidized bed whereby the water can be split into hydroxyl and hydrogen radicals making hydrogen radicals react, with the oxygen in the hot and now unstable aluminum or metal compound and thus releasing aluminum or metal atoms, and the hydroxyl radical reacting back to water and if carbon is used, the surplus of oxygen reacting with carbon to CO or $CO_2$.

5 Claims, 8 Drawing Sheets

PRODUCTION OF METAL SUCH AS ALUMINUM, MAGNESIUM, SILICON FROM METAL OXIDE COMPOUNDS

This invention relates to a new process to produce metals such as aluminium, magnesium, silicon and the like by thermo-mechanical means within a reactor chamber where the oxide or other metal compounds are subject to an intense agitation and vibrations thus generating heat in the material.

To explain the process aluminum is used as an example in this description, but it is valid for other types of oxides and/or other metal compounds as will be seen later in the present invention.

Aluminium is at present produced in large scale facilities throughout the world by different electrolytical processes using electrical energy as a main source for the electrolytical reactions. The electrolyte is established by adding cryolite to an aluminium-oxide bath at a temperature of about 800° C. Carbon is used as electrodes.

The main advantage, by the method is that it is well developed and operates under stabile conditions. It is further more regarded as the cheapest way to produce aluminium from aluminum oxide ($Al_2O_3$) which is upgraded from aluminum hydroxide $Al(OH)_3$.

The disadvantage of the processes are that they are highly energy consuming. From theory approx. 8,5 kWh each kg aluminum has to be utilised in the electrolytical process. but because of heat and energy loss in the process. the practical amount of energy is normally in the range of 12 kWh each kg. Enormous research is taking place all over the world to improve energy efficiency and, where only small reduction gives enormous economical benefits due to the vast amount of energy utilised. In addition to the cost of energy, the cost of aluminum is also affected by the cost of cryolite and carbon consumption and huge gas cleaning facilities.

The present invention describe a method to obtain production of aluminum from aluminum compounds by other means than at present known from the industry. The aim of the method is to obtain a high-efficiency cracking of the aluminum compounds into aluminum and water at low pressure and temperature with an energy-requirement less than any other known method, and with no use of cryolite and no emission of toxic gases.

The principle of the process that is called turbo-cracking, is to threat the compounds in a echanical established hot fluidized bed. The mechanical fluidized bed has been found to give rise to the following effects to achieve the cracking:

1. Delivery of the heat to the material by frictional and hydrodynamic forces.
2. Reversed speed of evaporation in the presence of free water or water generating chemicals (hydrogen and oxygen) as a part of the chemical composition of the aluminum compound which leads to cracking of water into hydrogen and, hydroxyl-radicals.
3. The creation of micro-bubbles with extreme pressure and temperature.
4. Quenching of the released heat from micro-bubbles to the process ambient temperature.
5. Creation of temperature spots in the cracking zone of the compounds grains and by the movement of the grains over the mechanical friction elements.

The mechanical, fluidized bed that takes place in a reactor chamber, can be established by different means. One practical mean is to apply a hammer-mill construction either with a cylindrical vessel or a conical vessel with internal <<steps>> whereby the material can be subject to different velocities from the hammers, and, where one or more of the steps can be cooled to control the chemical reactions taking place in the reactor. One other mean is a ball-mill construction. Even another mean is to establish the fulidized bed, to use magnetic metal as bed material put into rapid motion by magnetic forces by an electrical coil surrounding the reactor chamber vessel.

The mechanical motion of the bed in the process is carried out in such a manner that energy to establish the bed also delivers enough energy to heat it to the desired process temperature, and to maintain the temperature during the process. This is achieved, by that the mechanical means that establishes the bed, generates a pressure front against the mechanical means and the fludized solids and thereby delivers the energy similar to a turbine effect. In addition to the pressure front, the shear-forces that appear between the mechanical means and the individual solids, generate peak temperatures. This means that in the vicinity of the mechanical means, we have established a <<moving>> pressure and a temperature condition different from the ambient temperature in the process-chamber.

After the fluidized bed has been established, aluminum compounds are delivered into the process chamber together with a portion of water for the process. Water can be added to the aluminum compound as when using $Al_2O_3$ or being water generating chemicals as a part of the compound as when using aluminum hydroxide $Al(OH)_3$.

When entering the process chamber with its turbulent fludized bed, a so-called flash evaporation of the water, takes place. This means that as the water ambient pressure is subject to a temperature higher than its normal boiling point at that pressure, oversaturated steam is generated. But because of the mentioned difference in heat and pressure in the front of the mechanical means, ultrasonic vibrating expansion of the steam, takes place.

Before the evaporation, the water is mixed into the solids by the shear forces taking place by the mechanical means. In addition to the mechanical action by the mechanical means, the different solids-particles will also deliver a mechanical action to the water.

Being mixed into the solids, the water is also, subject to extreme large surface area of the fluidized bed and thus increasing the heat conductance between the fluidized area and the fluids itself.

Because of the extreme separation of the fluids in the solids that takes place before they are evaporated, the separation in addition to the vibration, generates microbubbles in the fluidized bed with extreme temperatures and pressure of several thousands of degree Kelvin and atmospheres. The released heat and the pressure in the micro-bubbles participates in the cracking of water molecules by an extreme speed in hydroxyl and hydrogen radicals. But because the ambient temperature in the process is far below the peak temperatures, the extreme good heat of convection, quenches the condition in the bursting micro-bubbles to ambient temperature within a minimum of time in the order of parts of microseconds.

By experiments in a 11 kW reactor, it has been found, that we are able to crack water at a temperature as low as 250° C. and at a relative motion between the friction elements and the solids in the order of 40–200 m/s. In the same reactor when adding aluminum oxide, carbon and water, we found that the reduction of the oxide started at a temperature of 265° C. and increased steadily up to the process temperature.

Without wishing to be bound by any specific theory, the reaction mechanism may be as follows:

When the oxide enters the reactor chamber under these conditions, it is heated to the process temperature as described above. The temperature together with the mechanical shear forces involved in the reactor chamber, reduces tension in the molecular structure and makes molecules sensitive for reaction with the radicals formed by water and thus the following reaction will take place:

The hydrogen radicals will react with the oxygen atoms connected to the oxide and thus forming water. This was evident under the above mentioned trials. The remaining hydroxyl radicals (OH⁻) will react back into water and oxygen. To replace the hydrogen lost in the reaction with the oxygen atoms from the oxide, this can be compensated by adding another hydrogen delivering material to the process chamber mixed into the oxide before it is charged into the process chamber. Such hydrogen delivering material can be oil or natural gas as methane ($CH_4$). Alternatively, carbon can be delivered and thus the oxygen will react with the carbon into CO or $CO_2$. In the above mentioned trials, both gases were formed.

When using aluminum oxide $Al_2O_3$ the reaction may tentatively be written as:

$$Al_2O_3 + 6H^+ \rightarrow 2Al + 3H_2O$$

Water necessary is:

$$6H_2O \rightarrow 6H^+ + 6OH^-$$

The hydroxyl radicals react back to:

$$6OH \rightarrow 3H_2O + 1,5\ O_2$$

The oxygen is reduced into $CO_2$ or CO by adding coke to the process before entering the process chamber.

The amount of carbon needed is equal to 1,5 mol each 1,5 mol $O_2$ for the $CO_2$.

Thus we have:

Each mol $Al_2O_3$ (molecular weight 102) gives 2 mols of Al, with molecular weight of 27 and requires:

6 mots of $H_2O$ with molecular weight of 18.02.

1,5 mol of C with molecular weight of 12.

Thus we need for each kg aluminum produced

Mol Al: 1000/27=37,04

Mol $Al_2O_3$:=37,04/2=18,52

Mol $H_2O$.=18,52*6=111

Mol C:=18,52*1,5=27,78

This gives in kg:

$Al_2O_3$: 18,52*102/1000=1,89/kg Al $H_2O$:=111*18,02/1000=2 kg

C:=27.,78*12/1000=0,33 kg

When the process temperature is reached, oxide with water and oil or coke is charged automatically to the reactor chamber to obtain the temperature. The temperature is maintained by that the cold material is trying to cool down the process and the energy input to heat it. Thus the energy-input is balanced by the input of the material and as such the process is controlled by the energy input and the temperature of the process as follows:

When the desired temperature is reached, the discharge of aluminum is done via a discharged arrangement that can be a rotating valve, pump or other practical means. As the load of the driving source then drops, cold material is automatically charged into the process chamber. The temperature will then drop, and the discharge is stopped until the temperature is reached again. When the process is balanced, discharge and feed go more or less continuously.

The regulation can also be carried out the other way around and which will be the case in the shown embodiment of the process. When the process temperature is reached, cold material is fed into the reactor chamber to cool it down. If there is not established a fixed bed as in the shown embodiment in FIG. 2, this will result in increased load on the driving force which then activates the discharge arrangement to reduce the load. By the shown embodiment one can chose either to have an automatically discharge of the product or a discharge activated by the load of the main drive.

The gases generated from the process, steam, $CO_2$ and CO is discharged from the to reactor chamber via a pipe arrangement to a condenser where the over saturated steam is condensed to water. The non-condensable gases are vented to air.

The over-saturated steam can be utilised to preheat the material to reduce the energy consumption.

The over all energy consumption is equal to the energy required to heat the oxide to the process temperature and to evaporate the water at the same temperature. The energy utilised to crack the water is recovered by the extreme exothermic reaction that takes place when reacting back to water.

The produced aluminum from the discharge arrangement can be discharged either as aluminum powder into a neutral atmosphere or being discharged as melted aluminum. Thus the process temperature is about 625° C.

By producing liquid aluminum, we will have a mixing-zone in the reactor of not cracked aluminum compound and liquid aluminum. By continuously feed of material this is automatically balanced in the reaction chamber.

By shut-down of the unit by liquid aluminum, this is carried out by increasing the feed of the material until the process is cooled under 600° C. whereby the aluminum will go over to aluminum powder.

From the above, the following energy requirement necessary to operate the process at 625° C. is when we have the following mixture each kg aluminum to be produced:

$Al_2O_3$=1,89 kg=44,8 w %

$H_2O$=2,00 kg=46,4 w %

C=0,33 kg=7,8 w %

Total 0 4,22 kg=10%

$Q = 1,89 * dt * c_s + 0,38 * dt' c_c + 2 * dH$ $c_s$=specific heat of Al2O3=1 kJ/kg° C.

dt=temperature difference=approx. 525° C.

$c_c$=specific heat of C=approx. 1 kJ/kg° C.

dH=enthalpy difference of water=approx. 3200 kJ/kg° C.

Q=1,89*525*1+0,33*1*525+2*3200=7565,5 kJ/kg Al

Q=2,1 kWh/kg Al

This shows that the energy requirement is substantially lower than for electrolytical production of aluminum.

When using aluminum hydroxide $Al(OH)_3$, the main reaction is:

$$16Al(OH)_3 + 12C \rightarrow 16\ Al + 2H_2O + 12CO_2$$

Thus we have:

Each mol of $Al(OH)_3$ (molecular weight 77,99) gives one mol of Al with molecular weight of 27. Thus 16 mols of $Al(OH)_3$ give 16 mols of Al and requires 12 mols C with molecular weight of 12.

Thus we have for each kg of aluminum:

Mol Al: 1000/27=37,04 mol.

Mol $Al(OH)_3$:=37,04/1=37,94 mol.

Mol C:=37,04/16*12=27,79 mol.

This gives in kg:

$Al(OH)_3$:=37,04*77,99/1000=2,98 kg/kg Al.

C:=27,79*12/1000=0,33 kg

The energy can be delivered to the shaft on the process chamber by any rotating source such as electrical motor, steam-turbine, diesel-engine etc. If thermal energy sources are utilised such as steam turbine, extensive heat-recovery can be utilised from steam from the process chamber and thus reducing the over all energy efficiency.

BRIEF DESCRIPTION OF THE DRAWINGS

FIG. 1 shows a simplified flowdiagram of the process with the following main elements: a) is a hopper with an internal mixer for receiving of aluminum compound, carbon and water. In the bottom of the hopper a screw conveyor b) is arranged driven by a variable motor c) which delivers the material to the reactor chamber d). In the reactor a rotor e) is located with friction elements (not shown) driven by a motor f). On the reactor chamber a valve arrangement g) is arranged for aluminum discharged and a pipe h) for discharged steam and CO or $CO_2$. The steam is condensed in a condenser i) where condensed water goes to drain and cooled $CO_2$ is vented to air or when CO is produced, this is burned (not shown). The dotted line j) shows alternative heat recovery by passing the steam and hot $CO_2$ into a heat exchanger situated in the hopper. The heat exchanger can be rotating pipe arrangement or hollow screw conveyors located at the bottom of the hopper. With a closed hopper construction, it is possible to preheat the material to about 150° C. whereby the pressure at the hopper will be about 5 bars which is equal to the saturated steam pressure at that temperature. The pipe s) illustrates an internal cooling line for partial cooling of the fludized bed over a portion of the total bed length. The heat accumulated in the water is removed by the heat exchanger t).

FIG. 2 shows one embodiment of the reactor chamber d) with the rotor e) and the friction elements k). At each end of the chamber a rotating seal and bearings 1) are situated. M) shows the entrance port for the material, n) the discharge port for the aluminum and o) the discharge port for the steam and $CO_2$ or CO. On the conical part of the chamber cylindrical rings p) are arranged with a ring plate q) extending the distance x from the cylindrical rings p). This distance is used to establish a fixed depth of the fludized bed inside each of the cylindrical rings. The load of the motor is thus established by the number of friction elements extending into the bed and the velocity of the rotor e). When allowing an overdrain at n) as shown in detail A, we will have a constant load on main drive and discharge of a product out of port n). If on the other hand we do not use the overdrain in A, the load will increase as the product is building up over area C and thus the discharge will be activated by the variations of the load of the main drive.

By using different widths on the friction elements k), it is possible to gain different specific load expressed in W/element both within the same cylinder rings p) and for each cylindrical ring. As the tip-speed of the friction elements are increasing for each step outwards by the different rings p), the specific load will also increase accordingly.

To control the chemical reaction taking place, for some deed it may be necessary to reduce the temperature of the fludized bed before discharge of the product. This is done by circulating water in the annulus r) via the ports s). By this arrangement, it is possible to increase the temperature in the first step far above the discharge temperature by cooling the bed over the cooled ring-area. By this arrangement, the friction elements in the cooling area is designed to deliver as little energy as possible to the bed and only function as a transport device for the material to the next step. By having one or more cooling and heating steps, it is possible to establish a variety of conditions in the process chamber favorising each aluminum compound to optimise the reactions.

d) is the process chamber where a shaft e) with friction elements is driven by an electrical motor u) via a V-belt pulley v). The material is brought to a hopper a) where it is mixed with water and carbon by the internal screws w). In addition to the mixing of the material, the screws w) also act as a heat-exchanger for pre-heating of the material by passing steam through the screw when constructed hollow.

From the hopper the material is fed into the process chamber d) by a screw-conveyor b) or other feasible charging device.

As the material is processed it flows in the direction from the screw-conveyor against the discharge arrangement consisting of a rotating valve g). Not shown is the receiver arrangement for the produced aluminum powder or liquid aluminium.

When operating the process at temperature about 625° C., the discharge arrangement consists of a valve-arrangement designed for liquid metal.

The generated over-saturated steam, leaves the process chamber via a pipe and a cyclone x) where solids carried by the steam is separated from the steam and CO or $CO_2$ flow.

From the cyclone the steam enters a condenser arrangement consisting of a baffle tray condenser y) and a cooler z). Non-condensable gases are discharged from the baffle tray condenser to a gas scrubber $\geqq$) or a filter. The cooler is cooled by water delivered from the pump ø) and the baffle tray condenser is cooled by condensate circulating from the baffle tray condenser, via the cooler z) and pump å) and to the baffle tray condenser again. Rinsing water in the baffle tray condenser is automatically discharged from the baffle tray condenser via valve aa).

The entire unit is controlled from the control-unit bb).

Figure 7:
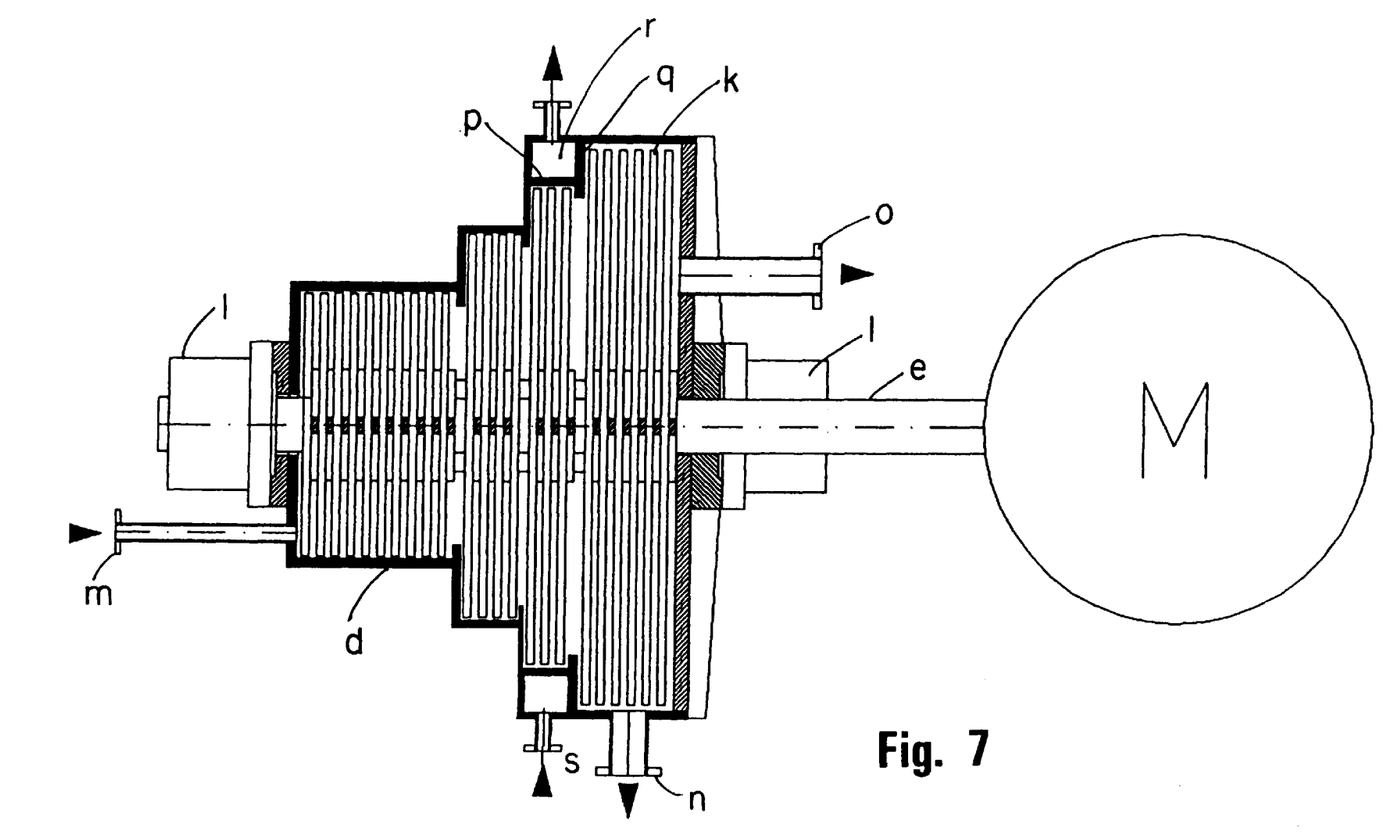
Figure 8:
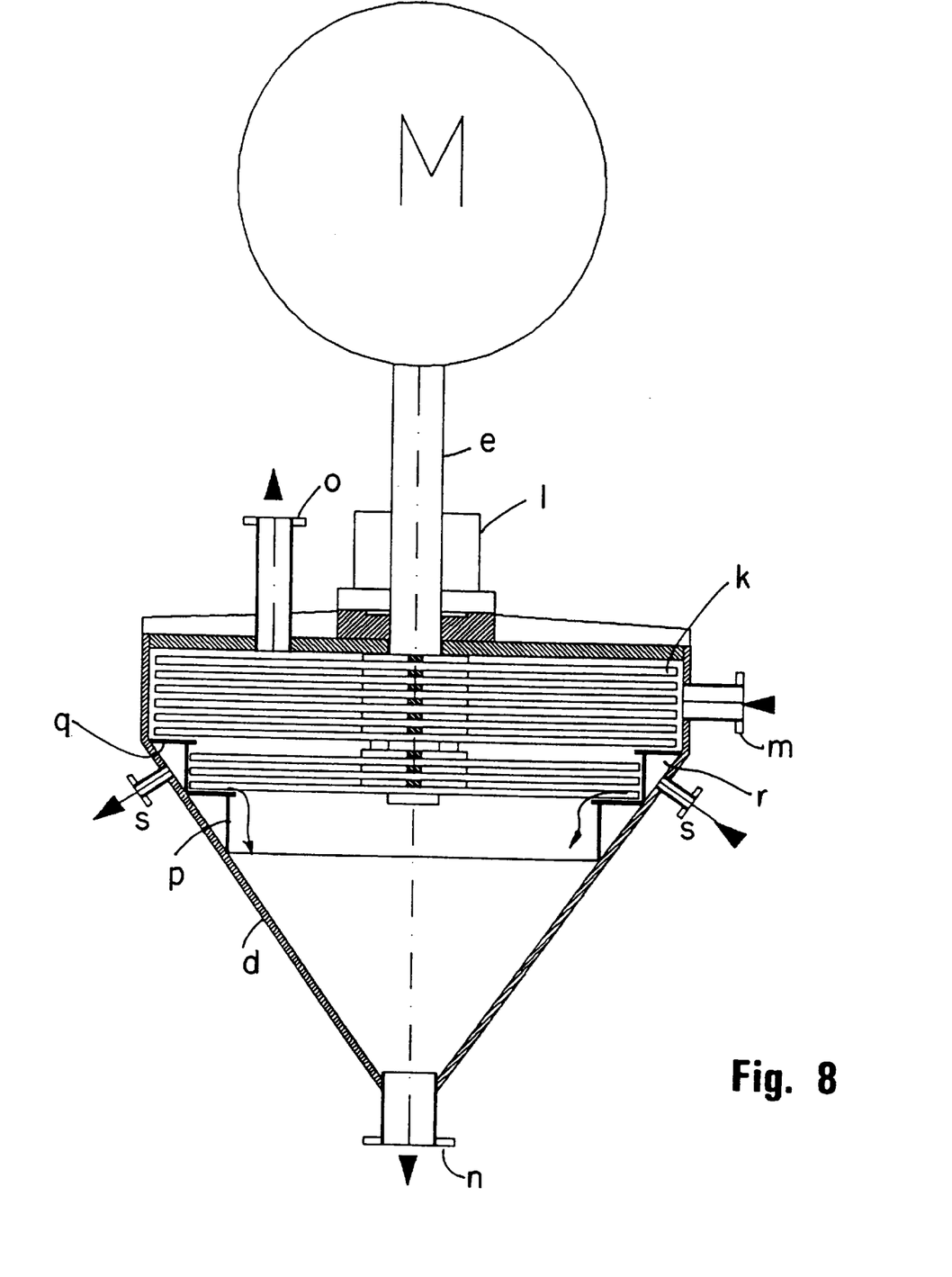

It has to be understood that this arrangement is only one of many lay-outs and alternatives for an aluminum or other metal producing unit based upon the principle in this invention. FIG. 7 and 8 show alternative arrangements for the reactor chamber. FIG. 7 shows a reactor chamber similar to FIG. 2, but where the conical part is replaced with cylinders making the step wise fludized bed.

FIG. 8 shows a vertical reactor chamber where the product is discharged at the bottom of the conical part at n). The aluminum compound is fed into the reactor at m) and steam and CO or $CO_2$ exit port o). The letters refer to the same parts as in the previous figures.

We claim:

1. A thermo-mechanical process for producing aluminium or other metals from aluminium or other metal compounds, the process comprising:

contacting solids of aluminium oxide or similar aluminium compounds or similar other metal compounds with either free water or water-forming constituents in the aluminum-or other metal compounds and a hydrogen- and carbon delivering material within a process chamber; and heating the aluminium oxide or similar aluminium compounds or similar other metal compounds by friction generated by mechanical forces from a rotating and/or agitating means within the process chamber together with either free water or water-forming constituents in the aluminium- or other metal compounds and the hydrogen- and carbon delivering material in such a manner that the material in the reactor chamber behaves like a hot mechanical fluidized bed whereby the water can be split into hydroxyl and hydrogen free radicals making hydrogen radicals react, with the oxygen in the hot and now unstable aluminium or metal compound and thus releasing aluminium or metal atoms, and the hydroxyl radical reacting back to water and if carbon is used, the surplus of oxygen reacting with carbon to CO or $CO_2$.

2. Process in accordance with claim 1, wherein the reactor chamber can be a horizontal vessel with a shaft carrying friction elements (blades) that agitates the material in the process chamber and that the motion between the friction elements and the solids generates heat.

Figure 1:
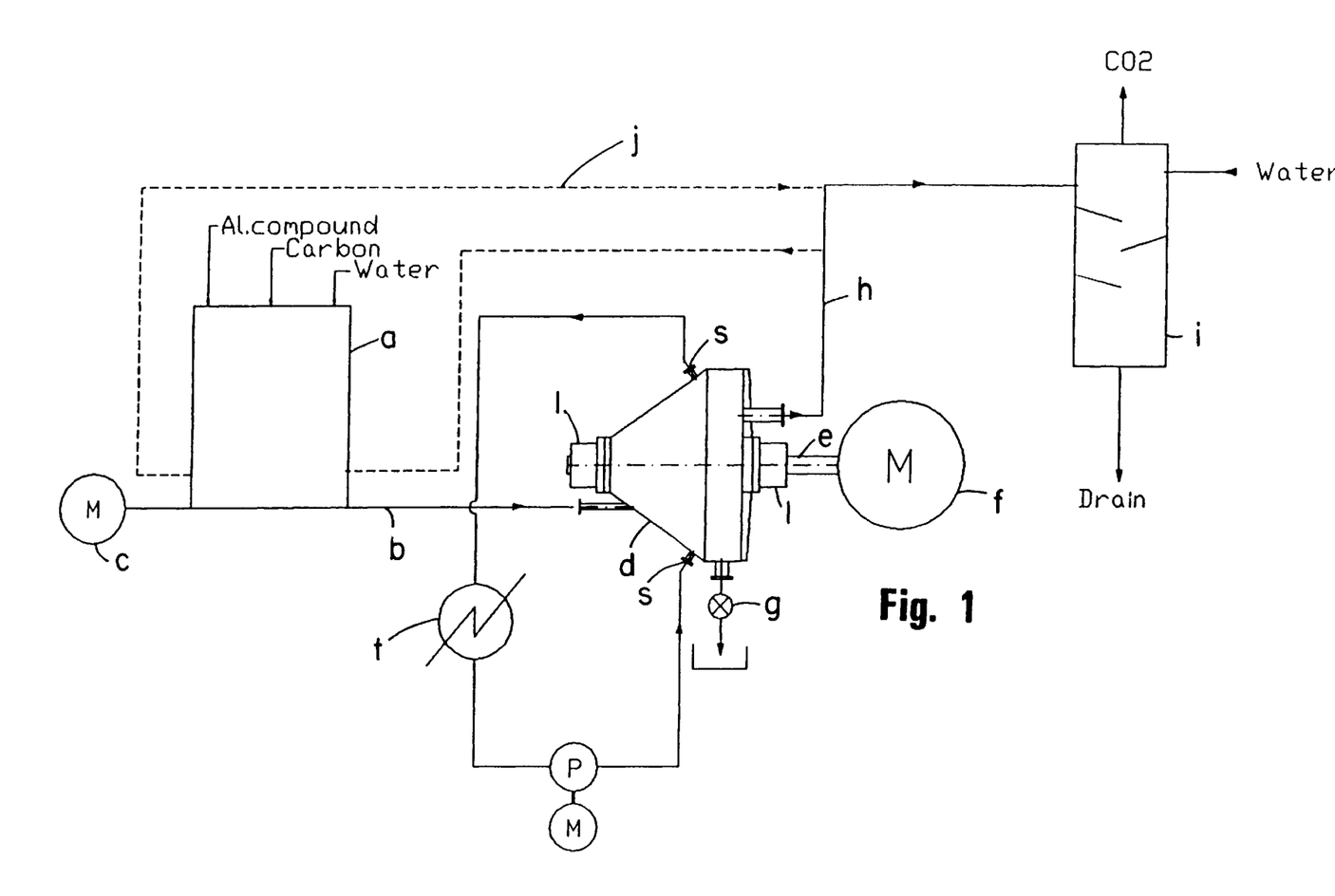
Figure 2:
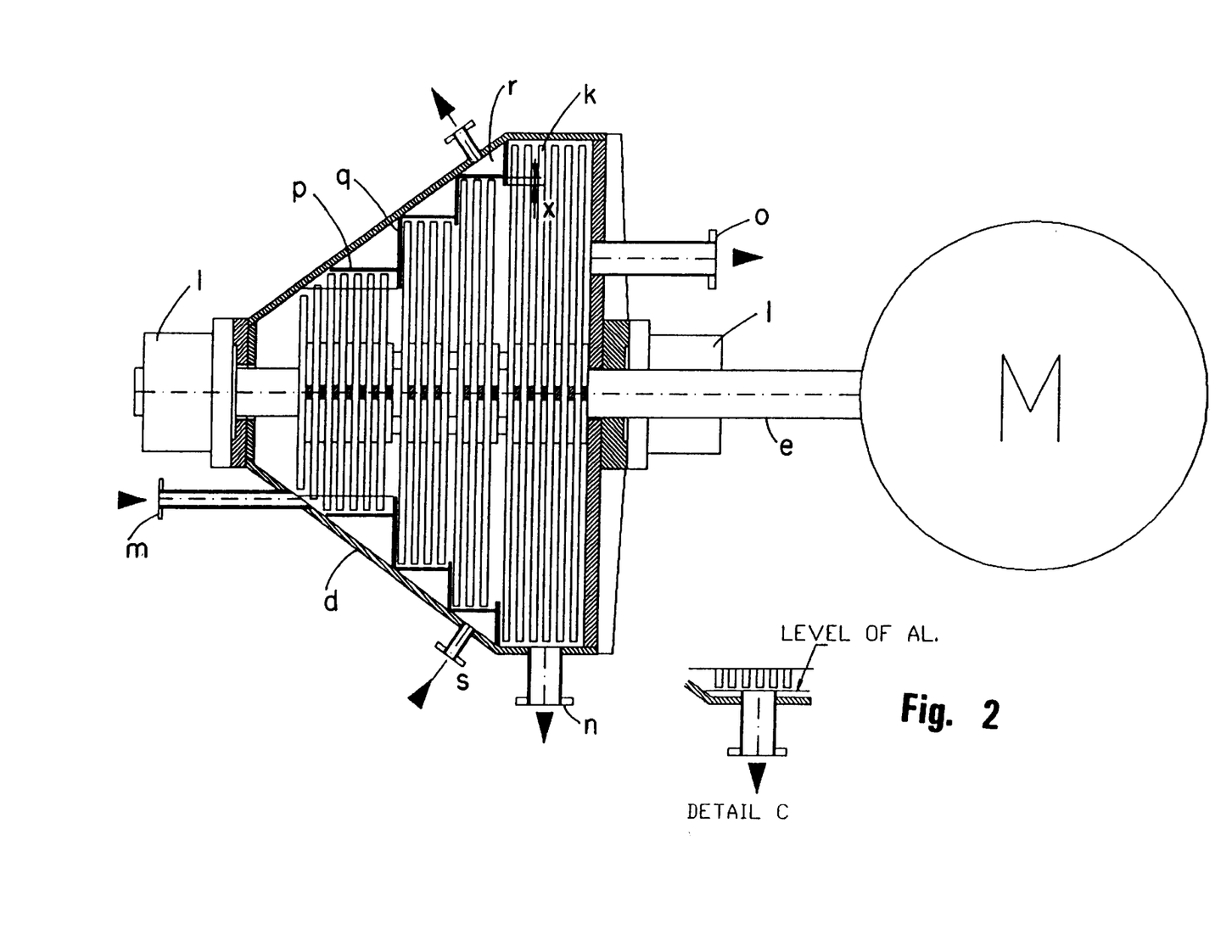
Figure 3:
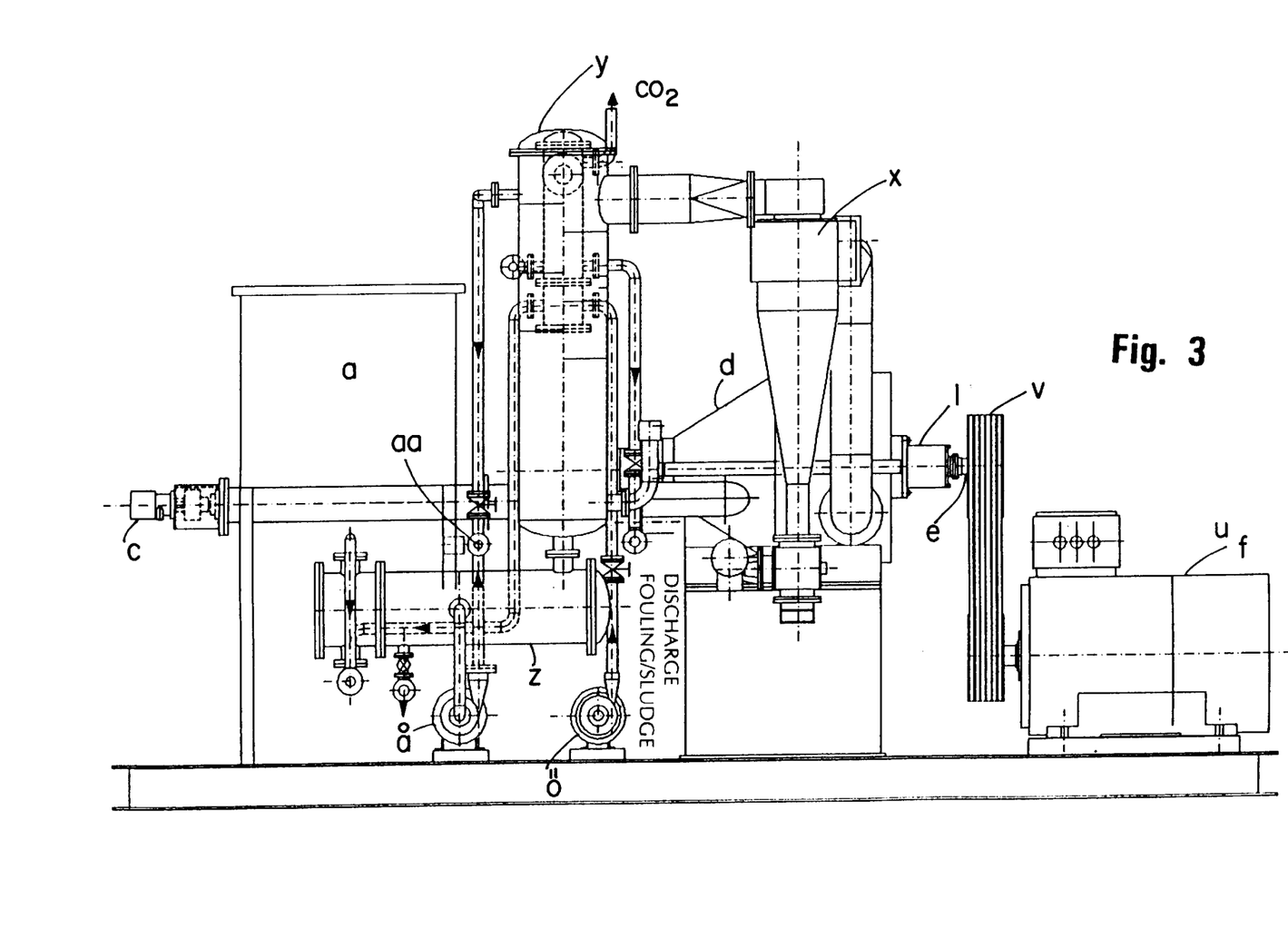
FIG. 3, 4, 5 and 6 shows a design of a test-unit, with the following items.
Figure 4:
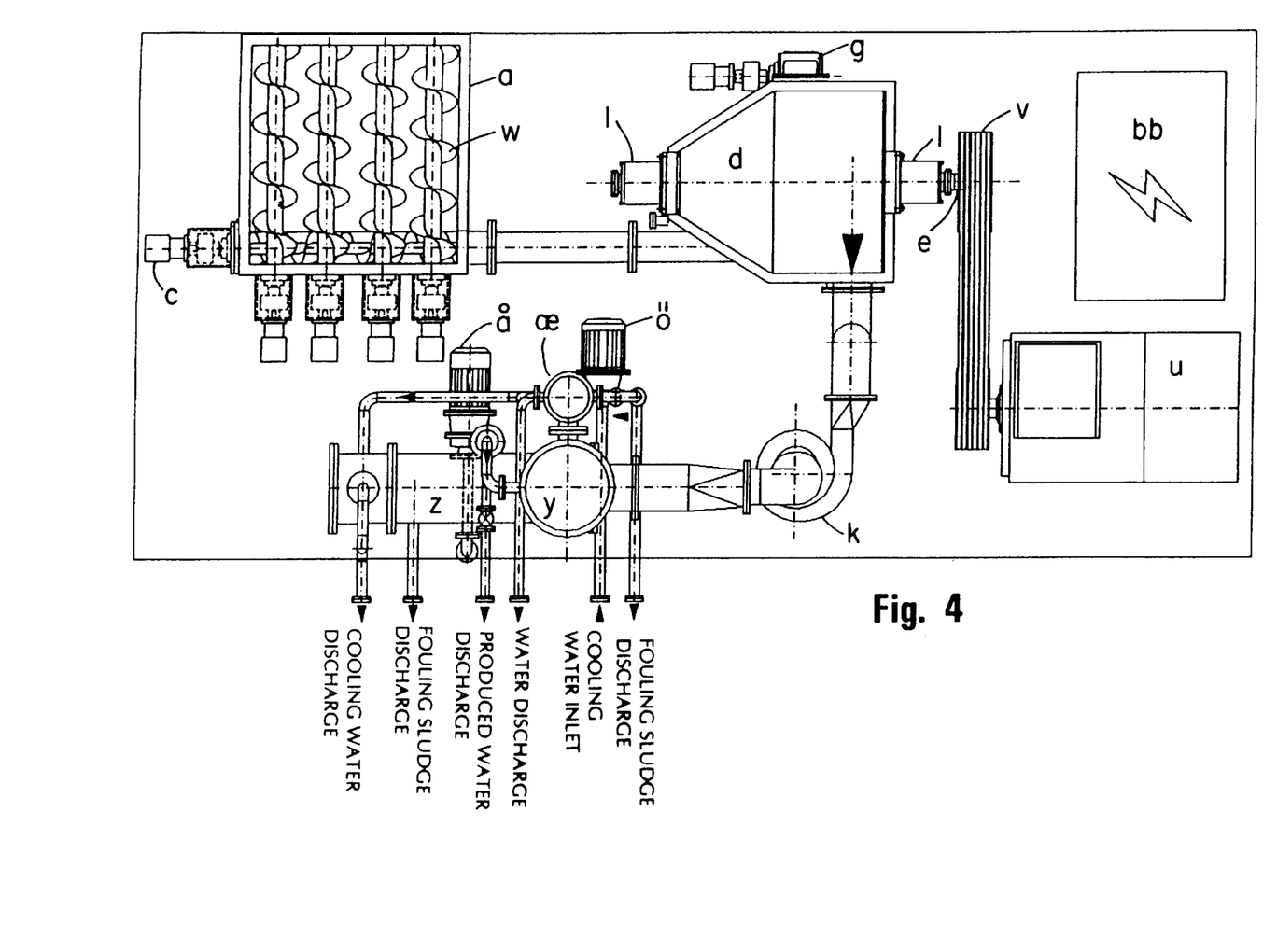
Figure 5:
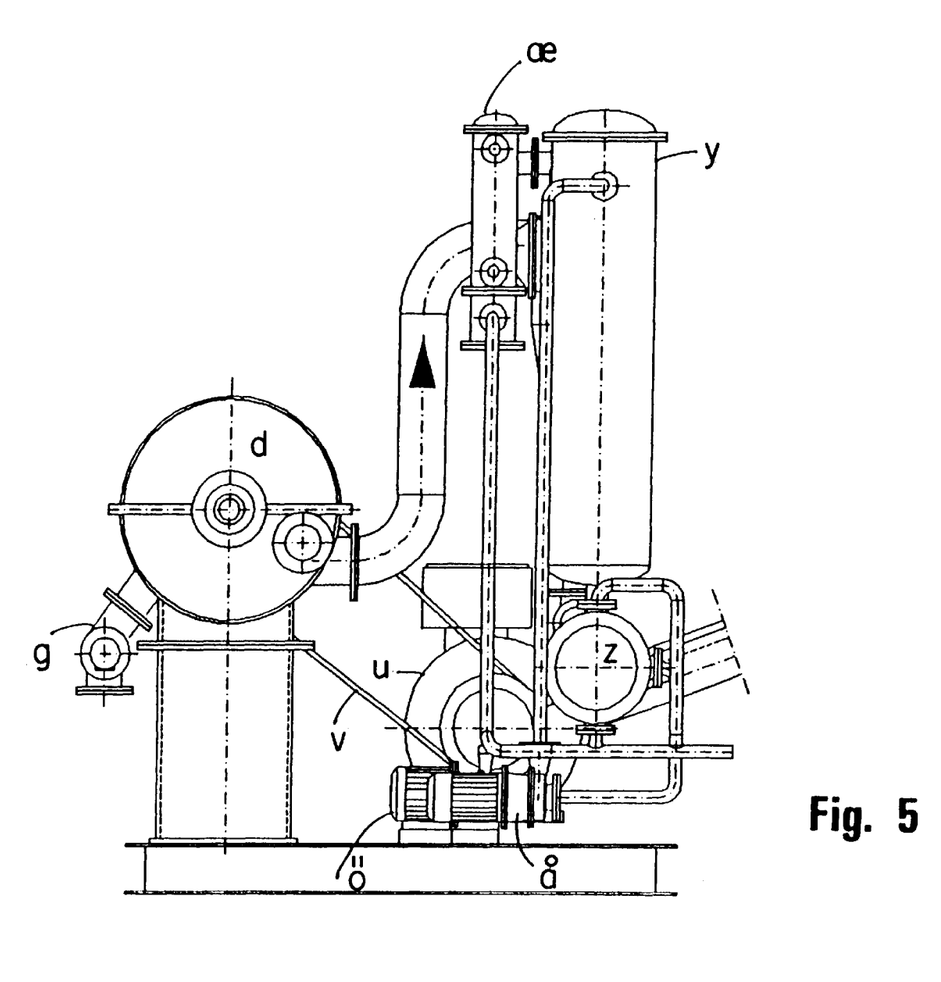
Figure 6:
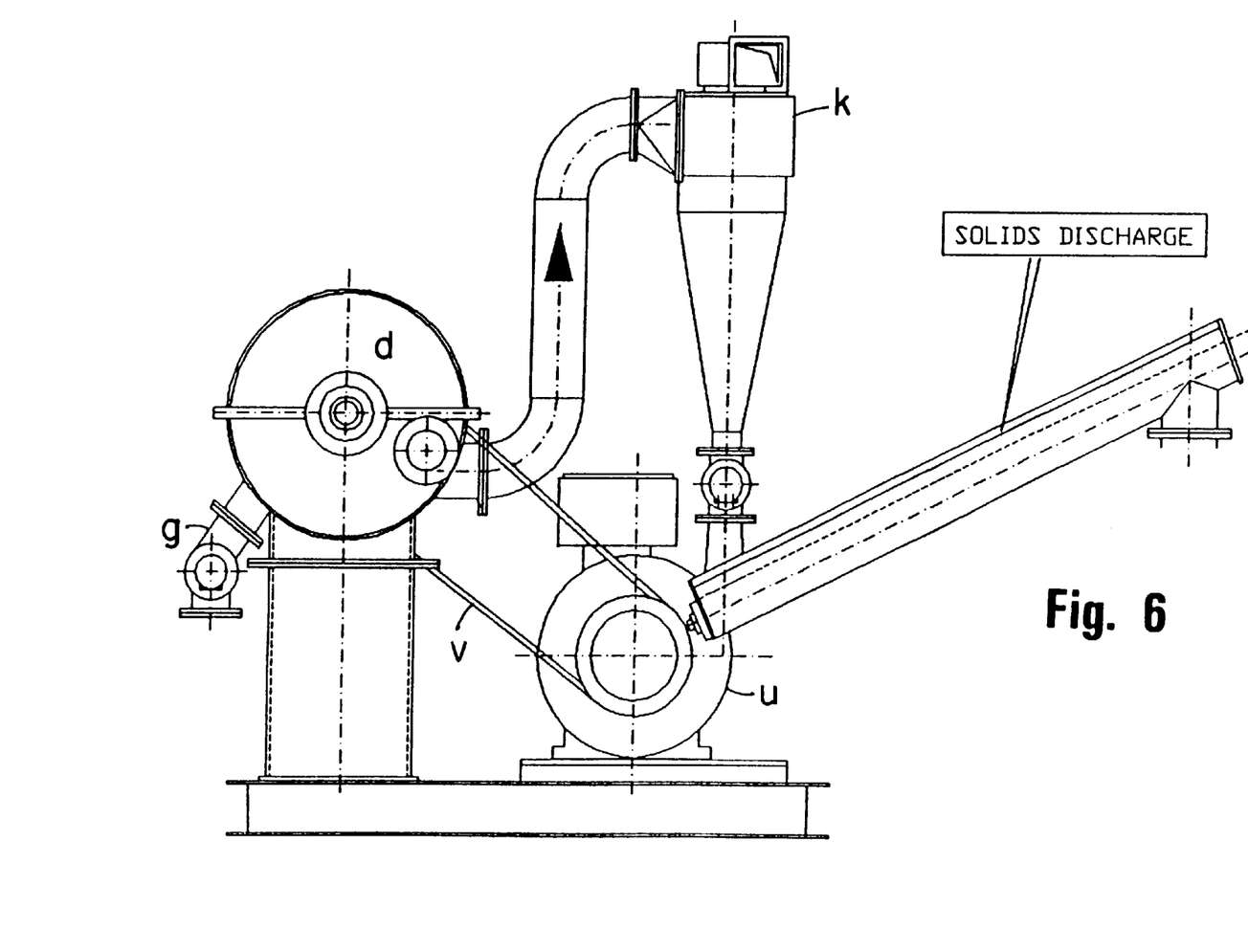

3. Process in accordance with claim 1, wherein the reaction chamber may be conical as illustrated in FIG. 2 with different fluidized beds and where one or more beds may be cooled down with water or another cooling agent.

4. Process in accordance with claim 3, wherein the friction elements may have different widths and thus supplying different specific energy to the fluidized bed expressed in watts per friction element or watts per square meter on each friction arm.

5. Process in accordance with claim 1, wherein the carbon delivering material is selected from the group consisting of oil, methane or other natural gas, and carbon.

* * * * *

UNITED STATES PATENT AND TRADEMARK OFFICE
CERTIFICATE OF CORRECTION

PATENT NO. : 6,086,655　　　　　　　　　　　　　　　　　　　　Page 1 of 1
DATED　　　 : July 11, 2000
INVENTOR(S) : Ellingsen et al.

It is certified that error appears in the above-identified patent and that said Letters Patent is hereby corrected as shown below:

Column 1,
Line 46, "echanical" should read -- mechanical --

Column 3,
Line 31, "60H" should read -- 60H$^-$ --
Line 39, "mots" should read -- mols --

Column 4,
Line 41, "10%" should read -- 100% --

Column 6,
Line 36, "$\leq$)" should read -- æ --

Signed and Sealed this

Thirteenth Day of November, 2001

*Attest:*

NICHOLAS P. GODICI
*Attesting Officer*　　*Acting Director of the United States Patent and Trademark Office*